(12) United States Patent
Petrogiannis

(10) Patent No.: US 6,751,632 B1
(45) Date of Patent: Jun. 15, 2004

(54) METHOD OF CREATING AUTHENTICATED VERIFIABLE REPRODUCTIONS OF ELECTRONIC DOCUMENTS

(75) Inventor: Tommy Petrogiannis, Montreal (CA)

(73) Assignee: Silanis Technology Inc., Quebec (CA)

( * ) Notice: Subject to any disclaimer, the term of this patent is extended or adjusted under 35 U.S.C. 154(b) by 0 days.

(21) Appl. No.: 09/405,240

(22) Filed: Sep. 24, 1999

(30) Foreign Application Priority Data

Sep. 25, 1998 (CA) .............................................. 2246049

(51) Int. Cl.$^7$ .............................................. G06F 17/30
(52) U.S. Cl. ........................... 707/104.1; 707/3; 707/5; 382/306
(58) Field of Search ............................. 707/104.1, 3, 5; 713/176; 705/51; 380/51; 382/306; 358/1.13, 1.14, 1.15

(56) References Cited

U.S. PATENT DOCUMENTS

| | | | | |
|---|---|---|---|---|
| 5,771,292 A | * | 6/1998 | Zunquan ..................... | 713/176 |
| 5,912,974 A | * | 6/1999 | Holloway et al. ............ | 380/51 |
| 5,982,956 A | * | 11/1999 | Lahmi ........................ | 382/306 |
| 2002/0143704 A1 | * | 10/2002 | Nassiri ........................ | 705/51 |
| 2003/0035539 A1 | * | 2/2003 | Thaxton ...................... | 380/51 |

FOREIGN PATENT DOCUMENTS

EP  0 565 314 A2  10/1993
WO  WO 98/03927  1/1998

OTHER PUBLICATIONS

The Impact of Technology on the Notary Process, http://law.uark.edu/~gahlers/notary.htm, XP002125327.

* cited by examiner

Primary Examiner—Dov Popovici
Assistant Examiner—Hassan Mahmoudi
(74) Attorney, Agent, or Firm—Merchant & Gould P.C.

(57) ABSTRACT

A method is described for creating an authenticated, verifiable reproduction of an electronic document. A master document is first created in a first format, and a DACm is created and linked to or stored with the master document. The master document is then opened and the DAC of the opened document is verified. If the DAC of the opened document is equal to DACm, the reproduction can proceed. The master document is then converted or reproduced into a format different from the first format to make a reproduced document. A DACr is created for the reproduced document, and DACm and DACr are either embedded into the reproduced document or stored in a linked storage system. Accordingly, two different versions of the master document exist, but each can be verified and authenticated separately. The method of the present invention provides for increased security in an environment where electronic documents can be created in one format and converted into another format.

9 Claims, 1 Drawing Sheet

METHOD OF CREATING AUTHENTICATED VERIFIABLE REPRODUCTIONS OF ELECTRONIC DOCUMENTS

FIELD OF THE INVENTION

The present invention relates to a method for creating authenticated verifiable reproductions of electronic documents.

DESCRIPTION OF THE PRIOR ARTS

The multiplication of internet and computer networks has brought with it the emergence of numerous types of document formats and computer systems. As a result, users can access an increasingly large number of sources in order to gather information. It is therefore not uncommon for users to create electronic documents by reproducing or converting other documents from other file formats. This, however, presents some problems, primarily regarding the authenticity and accuracy of the reproduced or converted document. In short, there is no way that users can be certain that in the process of reproduction or conversion no unauthorized errors or changes were introduced to the data. Current technology has no capacity to allow for the authentication and verification of a reproduced or converted document in one format separately from the master document, which may be in another format.

An existing system, such as U.S. Pat. No. 4,933,969 to Marshall et al., is limited to the authentication and storage of data and protects against unauthorized modifications. While this type of data authentication system contributes greatly to ensuring the security and integrity of data, it does not address the authentication and verification of reproduced or converted documents from different electronic formats.

Other systems offer types of electronic functions that are related to the generation and authentication of electronic signatures. For example, U.S. Pat. No. 5,195,133 to Kapp et al. describes a system designed to generate a completed payment document, which can be signed by a customer, and then capture that customer's signature in digital form. The principal feature of this mechanism is that it seeks to ensure that a signature approving a particular document was, in fact, captured at the time of the completion of the transaction to which it relates and was not obtained on some other occasion and merely reproduced for the particular transaction in question. The Kapp et al. patent creates a digital record of the transaction and captures a digital representation of the signature at the time the transaction is completed. This system then uses this digital record to encrypt the digital representation of the signature. However, this system is limited in that it does not apply to any situation where information may be reproduced or converted from an existing electronic document to another format and authenticated separately.

While each of the aforementioned systems can be useful for electronic business processes, they all have certain deficiencies. Current technology allows users to reproduce documents from one format to another. However, the above described systems lack the capacity to enable the user to authenticate and verify the reproduced documents separately from the master document.

SUMMARY OF THE INVENTION

It is an object of the present invention to provide a method for creating authenticated verifiable reproductions of electronic documents, in other words for ensuring that a translated document has not been altered from the original, master document. In accordance with the invention, this object is achieved with a method comprising the steps of:

(a) creating the electronic document under a first format;
(b) creating a document authentication code (DACm) linked to the electronic document;
(c) making the electronic document available to a user;
(d) for reproducing the document, performing the sub-steps of:
  (i) opening the electronic document;
  (ii) creating a DACmo linked to the opened electronic document;
  (iii) retrieving DACm;
  (iv) comparing DACm to DACmo and proceeding to the following sub-step only if DACm is equal to DACmo;
  (v) reproducing the document in a format different from the first format to create a reproduced document;
  (vi) creating a DACr for the reproduced document; and
  (vii) linking DACm and DACr to the reproduced document.

BRIEF DESCRIPTION OF THE DRAWINGS

The present invention and its advantages will be more easily understood after reading the following non-restrictive description of preferred embodiments thereof, made with reference to the following drawing in which.

DESCRIPTION OF A PREFERRED EMBODIMENT OF THE INVENTION

Figure 1:
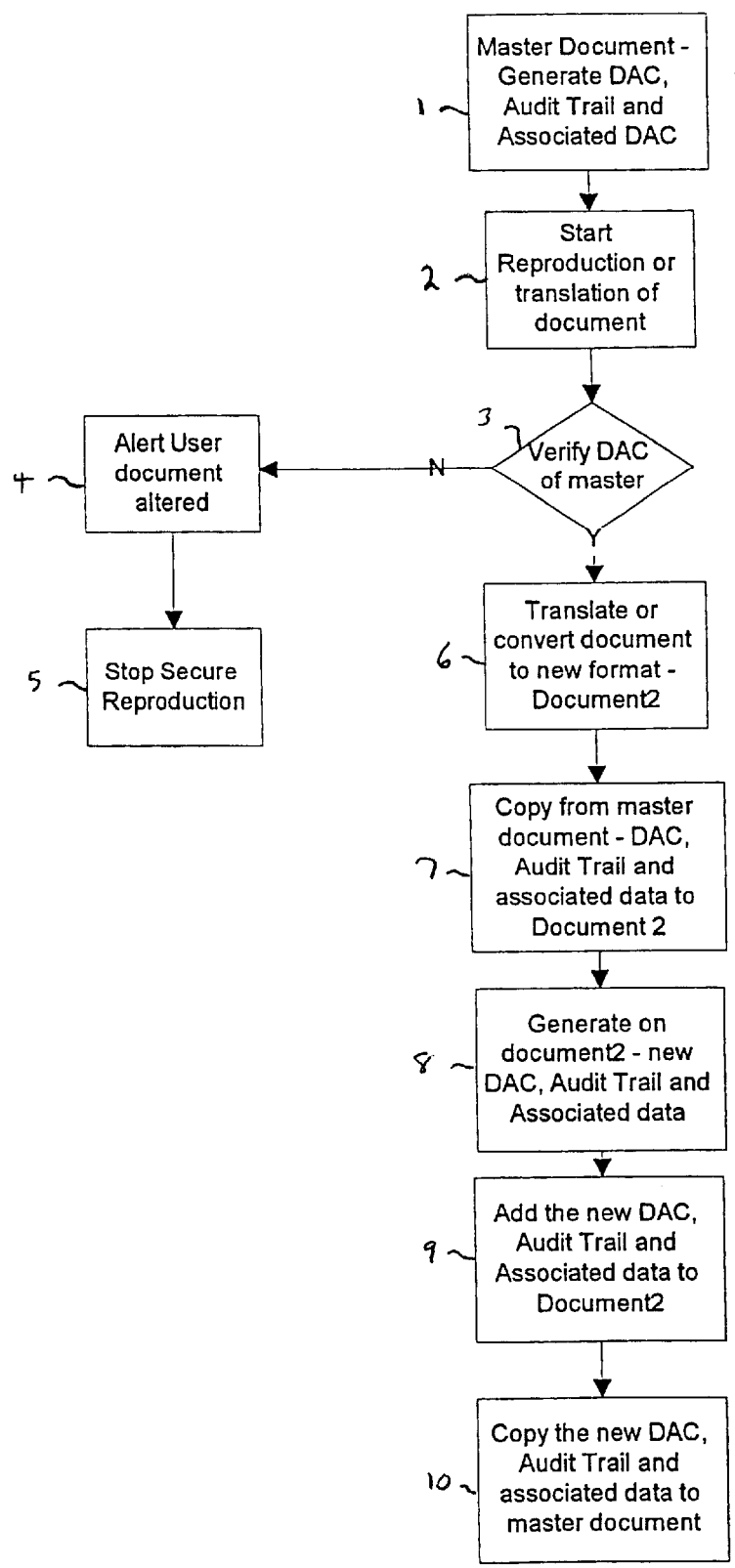
FIG. 1 is a block diagram of the method according to a preferred embodiment of the invention.

The present invention allows users to securely modify a converted or reproduced document distinctly from its original.

The present system of authenticated verifiable reproductions of electronic documents can serve as a vital tool in gathering data. It can offer assurance to users as to the accuracy and authenticity of converted or reproduced documents, a development which may encourage greater reliance on and use of electronic mechanisms, and particularly the internet, as a means of collecting data. Consequently, users can communicate, refer to and incorporate information from a wider range of electronic sources and formats with greater ease and security.

The present invention provides a method by which a document (the "master document") created in one system or format is reproduced or converted into another document with a different format (the "reproduced document") while still making it possible to verify the authenticity and accuracy of each document separately. Thus, the master document and the reproduced document exist as two separate and independent documents and each can be authenticated and verified separately. It is possible however, for users to authenticate or verify the two documents together as well. It should be understood that authentication or verification of a document can be performed using known methods or apparatuses.

As shown in FIG. 1, the method according to a preferred embodiment of the invention begins with the creation of a master document in step 1. Once the master document is created, a Document Authentication Code (DACm), which is a code assigned to a particular document that uniquely describes the contents of that document, is also created in step 1 using known methods. The DACm, audit trail (i.e. information generated for the document, such as date of creation, author, number of revisions, approvals, printing, or any other information relevant to the document) and associated relevant information are then embedded in the document or stored in a linked storage system. Once this process is complete, the reproduction or conversion of the document is started in step 2.

In step 2, the master document is opened, and DACmo is created and linked to the opened master document. The DACm is retrieved (either from within the opened master document or from a linked storage system), and a verification is performed at step 3. DACm of the master document is compared to DACmo. If the DAC is not verified, i.e. if the DACm of the master document is different from the DACmo of the opened master document, the method of the invention provides for an alert to the user at step 4 that the document has been altered and the reproduction process will be terminated at step 5. If the document is authenticated, i.e. if the DACm of the master document is the same as the DACmo of the opened master document, then the conversion or reproduction process can proceed at step 6. In step 6, the document is reproduced in a format different from the first format to create a reproduced document (Document 2 in FIG. 1). The DACm, audit trail and associated data is imported from the master document to the reproduced document at step 7. At steps 8 and 9, DACr is created, and DACr and DACm are linked to the reproduced document, either by embedding both of them in the reproduced document, or by storing them in a linked storage system. Preferably, the DACr, audit trail and associated data of the reproduced document are also linked to the master document at step 10.

A practical example follows. A master document is originally created with word processor X, running under a given operating system. The document is originally verified, by creating a DAC, and stored electronically. At a future time, or subsequently thereafter, the user wishes to convert the master document into a reproduced document, say, a PDF document. The method of the invention first verifies the DAC of the document to be converted with the DAC of the original, master document. If the DACs are identical, the conversion step can proceed.

The method according to a preferred embodiment of the invention then "converts" or "translates" the document into the reproduced document (i.e. into the desired format, operating system, etc.), by known means (most software today allow a user to save the document in a format different from the native format).

With the creation of another document in a different format, the DAC (DACm), audit trail and other associated information of the original, master document are copied onto the new reproduced document or stored in the Linked Storage System. A new DAC (DACr), as well as new audit trail and other related pertinent information from the reproduced document are added to the data from the master document. The entirety of this data is then embedded into the new reproduced document or can be stored in the linked storage system.

Upon completion of these steps, two separate documents, i.e. the master and the reproduced documents, exist on two different platforms (it should be understood that the expression "platform" is not limited to operating systems, but extends to different versions of a given software, to different software packages altogether, or to a combination thereof). Each document, the master document and the reproduced document, can be authenticated and verified independently of the other, as they each contain their own DACs, audit trail and related approval information.

The advantage of the present invention is that it ensures that translation, conversion or reproduction of documents from one format to another can be done accurately and free from unauthorized changes to the original document. With the emergence of numerous document formats and networks, and the increasing use of the internet for transactions and communication of documents, the present invention provides greater assurance as to the accuracy and authenticity of documents that have been reproduced or converted to other formats. It also allow users to securely manipulate or modify one version of the document without affecting the other version.

It should be noted however that the method of the present invention must be performed securely, in that the method cannot allow for formatting or other changes to the reproduced text. In a preferred embodiment, the method of the invention is embodied in a computer program, which performs all of the steps of the method without intervention by a user. Thus, the present invention insures that an original, verified document is in fact reproduced without any modifications whatsoever. Although this can lead to some "translation" errors when converting from one format to another, it nonetheless insures that the original document has been converted to another format securely and without any changes to the substance of the master document.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A method of creating an authenticated verifiable electronic reproduction of an electronic master document while preserving the integrity and authenticity of said master document and said reproduction said method comprising the steps of:

(a) creating the master document under a first format;

(b) creating a document authentication code (DACm) linked to the master document;

(c) making the master document available to a user;

(d) for securely reproducing the document, performing the sub-steps of:
  (i) opening the master document;
  (ii) creating a DACmo linked to the opened master document;
  (iii) retrieving DACm;
  (iv) comparing DACm to DACmo and proceeding to the following sub-step only if DACm is equal to DACmo;
  (v) reproducing the document in a format different from the first format to create a reproduced document;
  (vi) creating a DACr for the reproduced document; and
  (vii) linking DACm and DACr to the reproduced document.

2. A method according to claim 1, wherein said sub-step (d)(vii) of linking DACm and DACr to the reproduced document includes storing DACm and DACr with the reproduced document.

3. A method according to claim 1, wherein said sub-step (d)(vii) of linking DACm and DACr to the reproduced document includes storing DACm and DACr in a linked storage system.

4. A method according to claim 1, wherein said master document further includes an audit trail, and said sub-step (d)(vii) further includes linking said audit trail to the reproduced document.

5. A method according to claim 1, wherein said method further includes after step (v), copying from the master document the DACm, the audit trail, and associated information to said reproduced document.

6. A method according to claim 1, wherein said method further includes, after step (vi), adding DACr, the audit trail, and associated information to said reproduced document.

7. A method according to claim 1, wherein said sub-step (d)(vii) of linking DACm and DACr to the reproduced document includes embedding DACm and DACr, the audit trail, and associated information in the reproduced document.

8. A method according to claim 4, wherein said audit trail is embedded in said reproduced document or stored in a linked storage system.

9. A method according to claim 1, further including step (d)(viii) copying DACr, the audit trail, and associated information into said master document.

* * * * *